(12) United States Patent
Kim et al.

(10) Patent No.: US 12,116,429 B2
(45) Date of Patent: Oct. 15, 2024

(54) MODIFIER, MODIFIED CONJUGATED DIENE-BASED POLYMER AND METHOD FOR PREPARING THE SAME

(71) Applicant: LG Chem, Ltd., Seoul (KR)

(72) Inventors: Kyung Woo Kim, Daejeon (KR); Soo Yong Lee, Daejeon (KR); Seung Ho Choi, Daejeon (KR); Dong Gil Lee, Daejeon (KR); Tae Hee Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 610 days.

(21) Appl. No.: 17/604,100

(22) PCT Filed: Oct. 29, 2020

(86) PCT No.: PCT/KR2020/014886
§ 371 (c)(1),
(2) Date: Oct. 15, 2021

(87) PCT Pub. No.: WO2021/086039
PCT Pub. Date: May 6, 2021

(65) Prior Publication Data
US 2022/0204664 A1    Jun. 30, 2022

(30) Foreign Application Priority Data

Oct. 31, 2019 (KR) .................. 10-2019-0137406

(51) Int. Cl.
| | | |
|---|---|---|
| C08F 136/06 | (2006.01) | |
| C08C 19/22 | (2006.01) | |
| C08C 19/25 | (2006.01) | |
| C08F 4/54 | (2006.01) | |
| C08F 236/06 | (2006.01) | |
| C08K 5/5419 | (2006.01) | |

(52) U.S. Cl.
CPC ............ *C08F 136/06* (2013.01); *C08C 19/22* (2013.01); *C08C 19/25* (2013.01); *C08F 4/545* (2013.01); *C08F 236/06* (2013.01); *C08K 5/5419* (2013.01)

(58) Field of Classification Search
None
See application file for complete search history.

(56) References Cited

U.S. PATENT DOCUMENTS

| | | |
|---|---|---|
| 4,608,270 A | 8/1986 | Varaprath |
| 5,128,416 A | 7/1992 | Imai et al. |
| 5,219,938 A | 6/1993 | Imai et al. |
| 5,557,784 A | 9/1996 | Dayan et al. |
| 5,811,085 A | 9/1998 | Halloran |
| 8,613,298 B2 | 12/2013 | Kaszas |
| 2009/0283187 A1 | 11/2009 | Kaszas |
| 2013/0211119 A1 | 8/2013 | Kjus et al. |
| 2014/0073756 A1 | 3/2014 | Kjus et al. |
| 2014/0080966 A1 | 3/2014 | Kjus et al. |
| 2015/0284496 A1 | 10/2015 | Kjus et al. |
| 2016/0326291 A1 | 11/2016 | Kjus et al. |
| 2018/0030173 A1 | 2/2018 | Kang et al. |
| 2018/0030174 A1 | 2/2018 | Kang et al. |
| 2018/0037675 A1 | 2/2018 | Kang et al. |
| 2018/0044452 A1 | 2/2018 | Kang et al. |
| 2018/0162959 A1 | 6/2018 | Choi et al. |
| 2018/0170102 A1 | 6/2018 | Lee et al. |
| 2018/0305470 A1 | 10/2018 | Lee et al. |
| 2018/0312669 A1 | 11/2018 | Kang et al. |
| 2019/0153124 A1 | 5/2019 | Seo et al. |
| 2019/0367648 A1 | 12/2019 | Kang et al. |
| 2020/0010596 A1 | 1/2020 | Kim et al. |
| 2020/0123289 A1 | 4/2020 | Kang et al. |

FOREIGN PATENT DOCUMENTS

| | | |
|---|---|---|
| EP | 3296322 A1 | 3/2018 |
| EP | 3296324 A1 | 3/2018 |
| EP | 3345940 A1 | 7/2018 |
| EP | 3351570 A1 | 7/2018 |
| EP | 3360905 A1 | 8/2018 |
| EP | 3409718 A1 | 12/2018 |
| JP | H01284504 A | 11/1989 |
| JP | H02107629 A | 4/1990 |
| JP | 2009214700 A | 9/2009 |
| JP | 6105336 B2 | 3/2017 |
| KR | 20170000810 A | 1/2017 |
| KR | 20170074677 A | 6/2017 |
| KR | 20170082065 A | 7/2017 |
| WO | 2013119894 A1 | 8/2013 |

OTHER PUBLICATIONS

Extended European Search Report for Application No. 20881853.4 dated May 13, 2022, pp. 1-5.
International Search Report for PCT/KR/2020/014886 dated Feb. 3, 2021, 4 pgs.
O. Villamo et al., Hybrid organic inorganic membranes containing a fixed thio ether complexing agent for the facilitated transport of silver versus copper ions, Journal of Membrane Science, 2002, 204, pp. 97-110.

*Primary Examiner* — Nicole M. Buie-Hatcher
(74) *Attorney, Agent, or Firm* — Lerner David LLP

(57) ABSTRACT

A modifier useful for modifying a polymer providing a functional group having affinity with a filler, particularly, a silica-based filler is provided. A modified conjugated diene-based polymer including a functional group derived from the modifier having excellent affinity with a filler and improved compounding properties, and a method for preparing the same are also provided.

14 Claims, No Drawings

MODIFIER, MODIFIED CONJUGATED DIENE-BASED POLYMER AND METHOD FOR PREPARING THE SAME

CROSS-REFERENCE TO RELATED APPLICATIONS

The present application is a national stage entry of International Application No. PCT/KR2020/014886 filed on Oct. 29, 2020, which claims priority from Korean Patent Application No. 10-2019-0137406, filed on Oct. 31, 2019, the entire contents of which are incorporated herein by reference.

TECHNICAL FIELD

The present invention relates to a modifier useful for modifying a polymer, a modified conjugated diene-based polymer having excellent affinity with a filler and improved compounding properties, and a method for preparing the same.

BACKGROUND ART

Recently, according to the growing attention on energy conservation and environmental issues, the decrease of the fuel consumption ratio of cars is required. As a method for accomplishing the requirement, a method of reducing the heating properties of tires using an inorganic filler such as silica and carbon black in a rubber composition for forming tires has been suggested. However, the dispersion of the inorganic filler in the rubber composition is unfavorable, and defects of degrading overall physical properties of the rubber composition including abrasion resistance, crack resistance or processability arise.

In order to solve such problems, a method of modifying the polymerization active part of a conjugated diene-based polymer which is obtained by anionic polymerization using an organolithium with a functional group which is capable of making interaction with an inorganic filler, has been developed as a method for increasing the dispersibility of an inorganic filler such as silica and carbon black in a rubber composition. Particularly, a method of modifying the polymerization active terminal of a conjugated diene-based polymer with a tin-based compound, a method of introducing an amino group, or a method of modifying with an alkoxysilane derivative have been suggested.

However, when preparing a rubber composition using the modified conjugated diene-based polymer by the above-described methods, low heating properties may be secured, but the improving effects of the physical properties of a rubber composition, such as abrasion resistance and processability were insufficient.

As another method, a method of improving processability and physical properties by modifying a living active terminal using a specific coupling agent or a modifier in a living polymer obtained by coordination polymerization using a catalyst including a lanthanide rare earth element compound has been developed.

However, attempts have been conducted to reduce hysteresis loss by improving the dispersibility of silica in a rubber composition and reducing the mobility of rubber molecule terminals through the bonding with silica particles, but effects thereof are insufficient, and the development of rubber having high affinity with a filler including silica is still required.

Prior Art Document

Patent Document

U.S. Pat. No. 5,557,784

DISCLOSURE OF THE INVENTION

Technical Problem

An object of the present invention is to provide a modifier which may provide a functional group having affinity with a filler, particularly, a silica-based filler.

Another object of the present invention is to provide a modified conjugated diene-based polymer including a functional group derived from the modifier, and a method for preparing the same.

TECHNICAL SOLUTION

To solve the above-mentioned problems, the present invention provides a modifier represented by the following Formula 1:

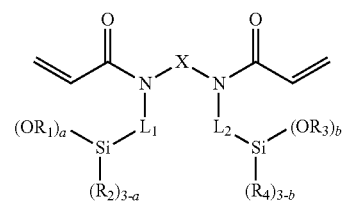

[Formula 1]

in Formula 1,
X is an alkylene group of 1 to 20 carbon atoms, a cycloalkylene group of 5 to 20 carbon atoms or an arylene group of 6 to 20 carbon atoms,
$L_1$ and $L_2$ are each independently an alkylene group of 1 to 20 carbon atoms, a cycloalkylene group of 5 to 20 carbon atoms or an arylene group of 6 to 20 carbon atoms,
$R_1$ to $R_4$ are each independently an alkyl group of 1 to 20 carbon atoms, and
a and b are each independently an integer of 1 to 3.

In addition, the present invention provides a modified conjugated diene-based polymer including a functional group derived from the modifier represented by Formula 1.

In addition, the present invention provides a method for preparing a modified conjugated diene-based polymer, including: (S1) polymerizing a conjugated diene-based monomer in the presence of a catalyst composition including a neodymium compound in a hydrocarbon solvent to prepare an active polymer; and (S2) reacting the active polymer and a modifier represented by Formula 1.

ADVANTAGEOUS EFFECTS

In the modified conjugated diene-based polymer according to the present invention, a functional group derived from a modifier represented by Formula 1 is coupled with a polymer chain, and affinity with a filler is shown excellent. In addition, if applied to a rubber composition, effects of excellent processability, and excellent compounding properties such as tensile properties and viscoelasticity properties may be accomplished.

MODE FOR CARRYING OUT THE INVENTION

Hereinafter, the present invention will be described in more detail to assist the understanding of the present invention.

It will be understood that words or terms used in the description and claims of the present invention shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

Modifier

The modifier of the present invention is characterized in being represented by Formula 1 below.

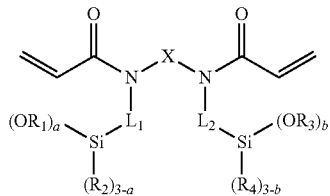

[Formula 1]

In Formula 1,

X is an alkylene group of 1 to 20 carbon atoms, a cycloalkylene group of 5 to 20 carbon atoms or an arylene group of 6 to 20 carbon atoms, $L_1$ and $L_2$ are each independently an alkylene group of 1 to 20 carbon atoms, a cycloalkylene group of 5 to 20 carbon atoms or an arylene group of 6 to 20 carbon atoms, $R_1$ to $R_4$ are each independently an alkyl group of 1 to 20 carbon atoms, and a and b are each independently an integer of 1 to 3.

Particularly, in Formula 1, X is an alkylene group of 1 to 20 carbon atoms, a cycloalkylene group of 5 to 20 carbon atoms or an arylene group of 6 to 20 carbon atoms, and particularly, X may be an alkylene group of 1 to 12 carbon atoms, an alkylene group of 1 to 4 carbon atoms, an alkylene group of 1 to 3 carbon atoms, for example, a methylene group.

Particularly, in Formula 1, $L_1$ and $L_2$ are each independently an alkylene group of 1 to 20 carbon atoms, a cycloalkylene group of 5 to 20 carbon atoms or an arylene group of 6 to 20 carbon atoms, and may be each independently an alkylene group of 1 to 12 carbon atoms, an alkylene group of 1 to 6 carbon atoms, an alkylene group of 1 to 4 carbon atoms, for example, a propylene group.

Particularly, in Formula 1, $R_1$ to $R_4$ are each independently an alkyl group of 1 to 20 carbon atoms, and $R_1$ to $R_4$ may be each independently an alkyl group of 1 to 12 carbon atoms, an alkyl group of 1 to 4 carbon atoms, for example, an ethyl group.

Particularly, in Formula 1, a and b are each independently an integer of 1 to 3, and a and b may be each independently an integer of 2 or 3, for example, a and b may be 3.

More particularly, the modifier represented by Formula 1 may be represented by Formula 1-1 below.

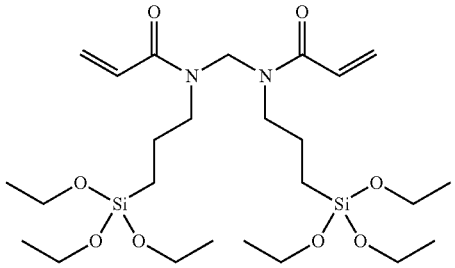

[Formula 1-1]

The modifier represented by Formula 1 includes a reactive functional group to a conjugated diene-based polymer, a functional group having affinity with a filler and a functional group having affinity with a solvent, and may easily modify the conjugated diene-based polymer with a high modification ratio, and accordingly, the abrasion resistance, low fuel consumption ratio and processability of a rubber composition including the same and a molded product such as a tire may be improved.

Particularly, the modifier represented by Formula 1 includes an acrylamide group which is a reactive functional group to a polymer in a molecule, and the reactive functional group shows high reactivity with respect to the active part of the conjugated diene-based polymer, and thus, the conjugated diene-based polymer may be modified with a high modification ratio. Particularly, the modifier represented by Formula 1 includes reactive functional groups at both terminals, and crosslinking reaction between active polymers may be carried out as well as the terminal modification of the active polymer, and accordingly, the degree of branching of a modified conjugated diene-based polymer may be effectively controlled to increase processability.

In addition, an alkoxysilane functional group may be introduced in the active polymer using the modifier represented by Formula 1, and through this, silanization reaction (production of Si—O—Si bond) of the alkoxysilane functional group with a silica filler is induced. Through this, the generation of agglomeration due to hydrogen bonds between hydroxyl groups present at the surface of the silica may be prevented, and the affinity with a filler may be markedly improved. Through this, the agglomeration between filler particles in a rubber composition may be prevented, the dispersibility of the filler may be improved, and the improving effects of a fuel consumption ratio of the rubber composition may be achieved through improved interaction with such a filler.

Also, through condensation reaction between alkoxysilane functional groups included in a polymer chain, chain-chain coupling reaction is performed, and a molecular weight is increased, linearity is reduced, and the processability of the active polymer becomes excellent, and thus, application in a rubber composition may be achieved advantageously.

As described above, the modifier has a structure maximizing the compounding properties of a modified conjugated diene-based polymer, and a modified conjugated diene-based polymer serving a rubber composition having excellent balance of the mechanical properties such as abrasion resistance and processability may be efficiently prepared.

In the present invention, the modifier represented by Formula 1 may be prepared by a preparation method including a step of reacting a compound represented by Formula 2 below and a compound represented by Formula 3 below.

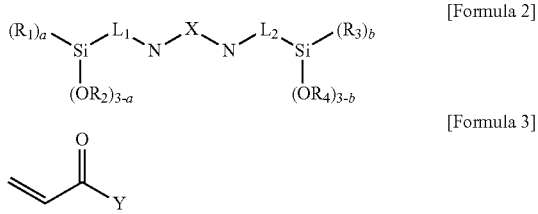

[Formula 2]

[Formula 3]

In Formula 2,
the explanation on X, $L_1$ and $L_2$, $R_1$ to $R_4$, and a and b is the same as described above.
In Formula 3,
Y is a halogen group, for example, Cl.

Modified Conjugated Diene-Based Polymer

In addition, the present invention provides a modified conjugated diene-based polymer including a functional group derived from a modifier represented by Formula 1 below.

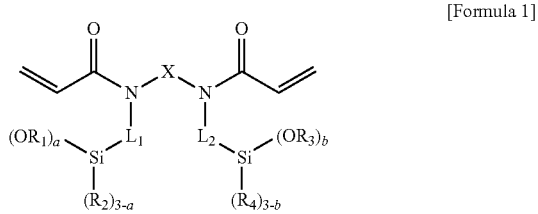

[Formula 1]

In Formula 1,
the explanation on X, $L_1$ and $L_2$, $R_1$ to $R_4$, and a and b is the same as described above.

In the present invention, the modified conjugated diene-based polymer may be prepared by reacting an active polymer and the modifier represented by Formula 1 through a preparation method described later, and the modified conjugated diene-based polymer may include a functional group derived from the modifier represented by Formula 1, and the physical properties thereof may be improved.

Particularly, the modified conjugated diene-based polymer includes the functional group derived from the modifier represented by Formula 1 and thus, includes a functional group having affinity with a filler and a functional group having affinity with a solvent, and accordingly, the abrasion resistance, low fuel consumption ratio and processability of a rubber composition including the same and a molded product manufactured therefrom such as a tire may be improved.

Since the modified conjugated diene-based polymer has stronger affinity with respect to a filler such as silica and carbon black in a rubber composition, if applied to a rubber composition, excellent compatibility with the filler may be shown, agglomeration of the filler may be prevented, dispersibility may be improved, and the processability of the rubber composition may be improved. Ultimately, effects of showing improved abrasion resistance performance and low rotation resistance required for a tire may be achieved.

In the present invention, the conjugated diene-based polymer may be a butadiene homopolymer such as polybutadiene, and a diene-based copolymer such as a butadiene-isoprene copolymer.

In a particular embodiment, the conjugated diene-based polymer may include 80 to 100 wt % of a derived unit from a 1,3-butadiene monomer, and selectively, 20 wt % or less of a derived unit from other conjugated diene-based monomers which are copolymerizable with 1,3-butadiene, and within the ranges, effects of not reducing the 1,4-cis bond content in a polymer may be obtained. In this case, as the 1,3-butadiene monomer, 1,3-butadiene or the derivatives thereof including 1,3-butadiene, 2,3-dimethyl-1,3-butadiene, or 2-ethyl-1,3-butadiene may be used, and as the other conjugated diene-based monomers which are copolymerizable with 1,3-butadiene, 2-methyl-1,3-pentadiene, 1,3-pentadiene, 3-methyl-1,3-pentadiene, 4-methyl-1,3-pentadiene, 1,3-hexadiene or 2,4-hexadiene may be used, and any one or compounds of two or more thereof may be used.

Preferably, the conjugated diene-based polymer may be the homopolymer of 1,3-butadiene, but is not limited thereto.

In the present invention, the modified conjugated diene-based polymer may be a modified conjugated diene-based polymer catalyzed with neodymium. That is, the modified conjugated diene-based polymer may be a conjugated diene-based polymer including an organometallic part activated by a catalyst composition including a neodymium compound. Preferably, the modified conjugated diene-based polymer may be a butadiene-based polymer catalyzed with neodymium, including a repeating unit derived from a 1,3-butadiene monomer.

The activated organometallic part may be an activated organometallic part of the terminal of a conjugated diene-based polymer (activated organometallic part of the terminal of a molecular chain), an activated organometallic part in a main chain, or an activated organometallic part in a side chain. Among them, in case of obtaining an activated organometallic part of a conjugated diene-based polymer by anionic polymerization or coordination anionic polymerization, the activated organometallic part may be the activated organometallic part of a terminal.

In the present invention, the modified conjugated diene-based polymer has a modification ratio of 5 to 90%, particularly, 20% or more, 30% or more, 40% or more, and 90% or less, 80% or less. Within this range, the compounding properties such as tensile properties and viscoelasticity properties of a rubber composition including the modified conjugated diene-based polymer may be excellent. The modification ratio may mean the ratio of a derived unit of a conjugated diene-based monomer coupled with a functional group derived from a modifier represented by Formula 1 in the modified conjugated diene-based polymer.

In the present invention, the modified conjugated diene-based polymer may have molecular weight distribution (Mw/Mn) of 1.1 to 4.0. Particularly, the molecular weight distribution of the modified conjugated diene-based polymer may be 1.1 or more, 1.5 or more, 2.0 or more, and 4.0 or less, 3.5 or less. The molecular weight distribution may be calculated from the ratio (Mw/Mn) of the weight average molecular weight (Mw) to the number average molecular weight (Mn). The number average molecular weight (Mn) is a common average of the molecular weight of individual polymer, which is calculated by measuring the molecular weights of n polymer molecules, obtaining the total of the molecular weights, and dividing the total by n, and the weight average molecular weight (Mw) represents the molecular weight distribution of a polymer composition. All average molecular weights may be represented by gram per mole (g/mol). In addition, each of the weight average molecular weight and the number average molecular weight may mean a polystyrene converted molecular weight analyzed by gel permeation chromatography (GPC).

The conjugated diene-based polymer may satisfy the molecular weight distribution described above and at the same time, may have the number average molecular weight of 100,000 to 1,000,000 g/mol, particularly, 100,000 g/mol or more, 200,000 g/mol or more, 230,000 g/mol or more, 250,000 g/mol or more and 1,000,000 g/mol or less, 800,000 g/mol or less, 500,000 g/mol or less.

In addition, the weight average molecular weight may be 300,000 to 1,500,000 g/mol, particularly, 300,000 g/mol or more, 350,000 g/mol or more, 400,000 g/mol or more, and 1,500,000 g/mol or less, 1,000,000 g/mol or less, 800,000 g/mol or less.

Within these ranges, if used in a rubber composition, tensile properties are excellent, processability is excellent, the workability of a rubber composition is improved, mulling and kneading are easy, and effects of excellent mechanical properties and balance of physical properties of the rubber composition may be achieved.

More particularly, if the modified conjugated diene-based polymer satisfies the weight average molecular weight (Mw) and the number average molecular weight conditions together with the molecular weight distribution, and if used in a rubber composition, tensile properties, viscoelasticity and processability of the rubber composition are excellent, and balance among them is excellent.

In the present invention, the modified conjugated diene-based polymer may have a Mooney viscosity (MV) at 100° C. of 20 to 100, particularly, 20 or more, 30 or more, 50 or more, and 100 or less, 80 or less, 75 or less.

The modified conjugated diene-based polymer according to the present invention may have a Mooney viscosity in the above-described range, and may have excellent processability.

The Mooney viscosity may be measured by using a Mooney viscometer, for example, using Large Rotor of MV2000E of Monsanto Co. at a rotor speed of 2±0.02 rpm at 100° C. Particularly, a polymer may be stood at room temperature (23±5° C.) for 30 minutes or more, and 27±3 g of the polymer may be collected and put in a die cavity, and then, Platen may be operated, and the Mooney viscosity may be measured while applying torque.

Method for Preparing Modified Conjugated Diene-Based Polymer

Also, the method for preparing a modified conjugated diene-based polymer of the present invention is characterized in including: (S1) polymerizing a conjugated diene-based monomer in the presence of a catalyst composition including a neodymium compound, in a hydrocarbon solvent to prepare an active polymer; and (S2) reacting the active polymer with a modifier represented by Formula 1.

Step (S1)

Step (S1) is a step of polymerizing a conjugated diene-based monomer in the presence of a catalyst composition including a neodymium compound in a hydrocarbon solvent to prepare an active polymer, wherein the active polymer may represent a conjugated diene-based polymer including an organometallic part.

The polymerization may be performed by radical polymerization, and may be performed by various methods such as bulk polymerization, solution polymerization, suspension polymerization, and emulsion polymerization, or may be performed by a batch method, a continuous method or a semi-continuous method. In a particular embodiment, the polymerization for preparing the active polymer may be performed by injecting a conjugated diene-based monomer to the catalyst composition and reacting in an organic solvent.

Particularly, in case of preparing by the solution polymerization, the active polymer may be prepared by injecting a conjugated diene-based monomer to the catalyst composition and reacting in a polymerization solvent.

In addition, the polymerization may be a polymerization with heating, an isothermal polymerization, or a polymerization at a constant temperature (adiabatic polymerization).

Here, the constant temperature polymerization denotes a polymerization method including a step of performing polymerization not by optionally applying heat but with self-reaction heat after the catalyst composition is injected, the polymerization with heating denotes a polymerization method in which the temperature is elevated by optionally applying heat after the catalyst composition is injected, and the isothermal polymerization denotes a polymerization method in which the temperature of the polymer is constantly maintained by taking away heat or applying heat after the catalyst composition is injected.

The polymerization may be performed at a temperature of 20 to 200° C., particularly at a temperature of 20° C. or more, 40° C. or more, 50° C. or more, and 200° C. or less, 150° C. or less, 100° C. or less. In addition, within the temperature range, the polymerization may be performed for 15 minutes to 3 hours, particularly, 15 minutes or more, 20 minutes or more, and 3 hours or less, 1 hour or less.

If the temperature during the polymerization is greater than 200° C., the sufficient control of the polymerization may be difficult, and it is apprehended that the cis-1,4 bond content of the conjugated diene-based polymer thus prepared is reduced, and if the temperature is less than −20° C., a polymerization reaction rate and efficiency may be deteriorated.

In the present invention, the hydrocarbon solvent may be a nonpolar solvent. Particularly, the hydrocarbon solvent may be one or more selected from the group consisting of an aliphatic hydrocarbon solvent such as pentane, hexane, isopentane, heptane, octane and isooctane, a cycloaliphatic hydrocarbon solvent such as cyclopentane, methylcyclopentane, cyclohexane, methylcyclohexane and ethylcyclohexane, and an aromatic hydrocarbon solvent such as benzene, toluene, ethylbenzene and xylene. As a particular example, the hydrocarbon solvent may be the aliphatic hydrocarbon solvent such as hexane. When using the polymerization solvent, the concentration of the monomer is not specifically limited, but may be 3 to 80 wt %, more particularly, 10 to 30 wt %.

In the present invention, the catalyst composition may include (a) a neodymium compound, (b) an alkylating agent, and (c) a halide, and may further include (d) a conjugated diene-based monomer.

(a) Neodymium Compound

The catalyst composition may include a neodymium compound in 0.1 to 0.5 mmol, particularly, 0.10 mmol or more, 0.15 mmol or more, and 0.50 mmol or less, 0.40 mmol or less, 0.25 mmol or less based on 100 g of the conjugated diene-based monomer.

The neodymium compound is activated by the first and second alkylating agents, and then, forms a catalyst active species for polymerizing the conjugated diene-based monomer.

The neodymium compound may include carboxylates thereof (e.g., neodymium acetate, neodymium acrylate, neodymium methacrylate, neodymium gluconate, neodymium citrate, neodymium fumarate, neodymium lactate, neodymium maleate, neodymium oxalate, neodymium 2-ethylhexanoate, neodymium neodecanoate, etc.); organophosphates thereof (e.g., neodymium dibutyl phosphate, neodymium dipentyl phosphate, neodymium dihexyl phosphate, neodymium diheptyl phosphate, neodymium dioctyl phosphate, neodymium bis(1-methylheptyl) phosphate, neodymium bis(2-ethylhexyl) phosphate, neodymium didecyl phosphate, etc.); organophosphonates thereof (e.g., neodymium butyl phosphonate, neodymium pentyl phosphonate, neodymium hexyl phosphonate, neodymium heptyl phosphonate, neodymium octyl phosphonate, neodymium (1-methylheptyl) phosphonate, neodymium (2-ethylhexyl) phosphonate, neodymium decyl phosphonate, neodymium dodecyl phosphonate, neodymium octadecyl phosphonate, etc.); organophosphinates thereof (e.g., neodymium butylphosphinate, neodymium pentylphosphinate, neodymium hexylphosphinate, neodymium heptylphosphinate, neodymium octylphosphinate, neodymium (1-methylheptyl)phosphinate, neodymium (2-ethylhexyl)phosphinate, etc.); carbamates thereof (e.g., neodymium dimethylcarbamate, neodymium diethylcarbamate, neodymium diisopropylcarbamate, neodymium dibutylcarbamate, neodymium dibenzylcarbamate, etc.); dithiocarbamates thereof (e.g., neodymium dimethyldithiocarbamate, neodymium diethyldithiocarbamate, neodymium diisopropyldithiocarbamate, neodymium dibutyldithiocarbamate, etc.); xanthates thereof (e.g., neodymium methylxanthate, neodymium ethylxanthate, neodymium isopropylxanthate, neodymium butylxanthate, neodymium benzylxanthate, etc.); β-diketonates thereof (e.g., neodymium acetylacetonate, neodymium trifluoroacetylacetonate, neodymium hexafluoroacetylacetonate, neodymium benzoylacetonate, etc.); alkoxides or aryloxides thereof (e.g., neodymium methoxide, neodymium ethoxide, neodymium isopropoxide, neodymium phenoxide, neodymium nonylphenoxide, etc.); halides or pseudo-halides thereof (e.g., neodymium fluoride, neodymium chloride, neodymium bromide, neodymium iodide, neodymium cyanide, neodymium cyanate, neodymium thiocyanate, neodymium azide, etc.); oxyhalides thereof (e.g., neodymium oxyfluoride, neodymium oxychloride, neodymium oxybromide, etc.); or organoneodymium-containing compounds including one or more neodymium-carbon bonds (e.g., $Cp_3Nd$, $Cp_2NdR$, $Cp_2NdCl$, $CpNdCl_2$, CpNd (cyclooctatetraene), $(C_5Me_5)_2NdR$, $NdR_3$, Nd (allyl)$_3$, Nd(allyl)$_2$Cl, etc., where R represents a hydrocarbyl group), and may include any one thereof or mixtures of two or more thereof.

Particularly, the neodymium compound may be a compound represented by Formula 4 below.

[Formula 4]

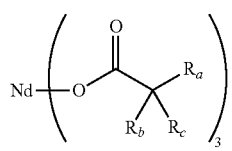

In Formula 4, $R_a$ to $R_c$ are independently hydrogen or an alkyl group having 1 to 12 carbon atoms, where $R_a$ to $R_c$ are not hydrogen at the same time.

In addition, considering excellent solubility in a solvent without fear of oligomerization, a conversion ratio into a catalyst active species, and consequent excellent improving effects of catalyst activity, in Formula 4, $R_a$ may be an alkyl group of 4 to 12 carbon atoms, and $R_b$ and $R_c$ may be each independently hydrogen or an alkyl group of 1 to 8 carbon atoms.

In a more particular embodiment, in Formula 4, $R_a$ may be an alkyl group of 6 to 10 carbon atoms, and $R_b$ and $R_c$ may be each independently hydrogen or an alkyl group of 1 to 4 carbon atoms.

In a more particular embodiment, in Formula 4, $R_a$ may be an alkyl group of 8 to 10 carbon atoms, and $R_b$ and $R_c$ may be each independently hydrogen or an alkyl group of 1 to 3 carbon atoms.

As described above, if the neodymium compound represented by Formula 4 includes a carboxylate ligand including alkyl groups having diverse lengths of 2 or more carbon atoms as a substituent at an α (alpha) position, steric change is induced around a neodymium central metal to block flocculation phenomenon among compounds, and as a result, restraining effects of oligomerization may be achieved. In addition, such a neodymium compound has high solubility in a solvent, the ratio of neodymium positioned at the central part, which is difficult to transform into a catalyst active species, is reduced, and a conversion ratio into an active species is high.

More particularly, the neodymium compound may be one or more selected from the group consisting of Nd(neodecanoate)$_3$, Nd(2-ethylhexanoate)$_3$, Nd(2,2-dimethyl decanoate)$_3$, Nd(2,2-diethyl decanoate)$_3$, Nd(2,2-dipropyl decanoate)$_3$, Nd(2,2-dibutyl decanoate)$_3$, Nd(2,2-dihexyl decanoate)$_3$, Nd(2,2-dioctyl decanoate)$_3$, Nd(2-ethyl-2-propyl decanoate)$_3$, Nd(2-ethyl-2-butyl decanoate)$_3$, Nd(2-ethyl-2-hexyl decanoate)$_3$, Nd(2-propyl 2-butyl decanoate)$_3$, Nd(2-propyl-2-hexyl decanoate)$_3$, Nd(2-propyl-2-isopropyl decanoate)$_3$, Nd (2-butyl-2-hexyl decanoate)$_3$, Nd(2-hexyl-2-octyl decanoate)$_3$, Nd (2, 2-diethyl octanoate)$_3$, Nd(2,2-dipropvl octanoate)$_3$, Nd(2,2-dibutyl octanoate)$_3$, Nd(2,2-dihexyl octanoate)$_3$, Nd(2-ethyl 2 propyl octanoate)$_3$, Nd(2-ethyl-2-hexyl octanoate)$_3$, Nd(2,2-diethyl nonanoate)$_3$, Nd(2,2-dipropyl nonanoate)$_3$, Nd (2, nonanoate)$_3$, Nd(2,2-dihexyl nonanoate) $_3$, Nd(2-ethyl propyl nonanoate)$_3$, and Nd(2-ethyl 2-hexyl nonanoate)$_3$.

In addition, the neodymium compound may have a solubility of about 4 g or more per 6 g of a non-polar solvent at room temperature (23±5° C.). The solubility of the neodymium compound means the degree of clear dissolution without generating turbid phenomenon. Through such high solubility, excellent catalyst activity may be attained.

Also, the neodymium compound may be used in the form of a reactant with a Lewis base. The reactant may improve the solubility of the neodymium compound in the solvent due to the Lewis base and may be stored in a stable state for a long period of time. The Lewis base, for example, may be used in a ratio of 30 mol or less, or 1 mole to 10 mol per 1 mol of the neodymium element. Examples of the Lewis base may be acetylacetone, tetrahydrofuran, pyridine, N,N-dimethylformamide, thiophene, diphenyl ether, triethylamine, an organic phosphorus compound, or a monohydric or dihydric alcohol.

(b) Alkylating Agent

The alkylating agent is an organometallic compound which is capable of transporting a hydrocarbyl group to another metal, and may act as a co-catalyst. The alkylating agent may use any alkylating agents used for preparing a common diene-based polymer without limitation, and may be an organometallic compound soluble in a polymerization solvent and containing a metal-carbon bond, such as an organoaluminum compound, an organomagnesium compound, and an organolithium compound.

Particularly, the organoaluminum compound may include alkylaluminum such as trimethylaluminum, triethylaluminum, tri-n-propylaluminum, triisopropylaluminum, tri-n-butylaluminum, triisobutylaluminum, tri-t-butylaluminum, tripentylaluminum, trihexylaluminum, tricyclohexylaluminum, and trioctylaluminum; and dihydrocarbylaluminum hydride such as diethylaluminum hydride, di-n-propylaluminum hydride, diisopropylaluminum hydride, di-n-butylaluminum hydride, diisobutylaluminum hydride (DIBAH), di-n-octylaluminum hydride, diphenylaluminum hydride, di-p-tolylaluminum hydride, dibenzylaluminum hydride, phenylethylaluminum hydride, phenyl-n-propylaluminum hydride, phenylisopropylaluminum hydride, phenyl-n-butylaluminum hydride, phenylisobutylaluminum hydride, phenyl-n-octylaluminum hydride, p-tolylethylaluminum hydride, p-tolyl-n-propylaluminum hydride, p-tolylisopropylaluminum hydride, p-tolyl-n-butylaluminum hydride, p-tolylisobutylaluminum hydride, p-tolyl-n-octylaluminum hydride, benzylethylaluminum hydride, benzyl-n-propylaluminum hydride, benzylisopropylaluminum hydride, benzyl-n-butylaluminum hydride, benzylisobutylaluminum hydride, and benzyl-n-octylaluminum hydride; hydrocarbylaluminum dihydride such as ethylaluminum dihydride, n-propylaluminum dihydride, isopropylaluminum dihydride, n-butylaluminum dihydride, isobutylaluminum dihydride, and n-octylaluminum dihydride, etc.

The organomagnesium compound may include alkylmagnesium compound such as diethylmagnesium, di-n-propylmagnesium, diisopropylmagnesium, dibutylmagnesium, dihexylmagnesium, diphenylmagnesium, and dibenzylmagnesium, and the organolithium compound may include an alkyllithium compound such as n-butyllithium.

In addition, the organoaluminum compound may be aluminoxane. The aluminoxane may be prepared by reacting a trihydrocarbylaluminum-based compound with water, particularly, linear aluminoxane of Formula 5a below or cyclic aluminoxane of Formula 5b below.

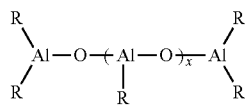

[Formula 5a]

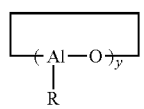

[Formula 5b]

In Formulae 5a and 5b, R is a monovalent organic group bonded to an aluminum atom via a carbon atom, and may be a hydrocarbyl group, and x and y may be each independently an integer of 1 or more, particularly 1 to 100, more particularly 2 to 50.

More particularly, the aluminoxane may include methylaluminoxane (MAO), modified methylaluminoxane (MAO), ethylaluminoxane, n-propylaluminoxane, isopropylaluminoxane, butylaluminoxane, isobutylaluminoxane, n-pentylaluminoxane, neopentylaluminoxane, n-hexylaluminoxane, n-octylaluminoxane, 2-ethylhexylaluminoxane, cylcohexylaluminoxane, 1-methylcyclopentylaluminoxane, phenylaluminoxane, or 2,6-dimethylphenylaluminoxane, and one or mixtures of two or more thereof may be used.

In addition, the modified methylaluminoxane may be one in which a methyl group of methylaluminoxane is substituted with a formula group (R), particularly, a hydrocarbon group having 2 to 20 carbon atoms, and may particularly be a compound represented by Formula 6 below.

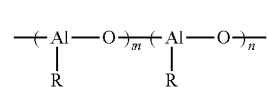

[Formula 6]

In Formula 6, R is the same as defined above, and m and n may be each independently an integer of 2 or more. Also, in Formula 6, Me represents a methyl group.

Particularly, in Formula 6, R may be an alkyl group having 2 to 20 carbon atoms, a cycloalkyl group having 3 to 20 carbon atoms, an alkenyl group having 2 to 20 carbon atoms, a cycloalkenyl group having 3 to 20 carbon atoms, an aryl group having 6 to 20 carbon atoms, an arylalkyl group having 7 to 20 carbon atoms, an alkylaryl group having 7 to 20 carbon atoms, an allyl group, or an alkynyl group having 2 to carbon atoms, and may particularly be an alkyl group having 2 to 20 carbon atoms such as an ethyl group, an isobutyl group, a hexyl group and an octyl group, more particularly, an isobutyl group.

More particularly, the modified methylaluminoxane may be one in which about 50 mol % to 90 mol % of the methyl group of the methylaluminoxane is substituted with the above-described hydrocarbon group. If the amount of the hydrocarbon group substituted in the modified methylaluminoxane is within the above range, alkylation may be promoted to increase the catalyst activity.

Such a modified methylaluminoxane may be prepared by a common method, and may particularly be prepared using trimethylaluminum and an alkylaluminum other than the trimethylaluminum. In this case, the alkylaluminum may be triisopropylaluminum, triethylaluminum, trihexylaluminum, or trioctylaluminum, and any one thereof or mixtures of two or more thereof may be used.

In addition, according to an embodiment of the present invention, the modified conjugated diene-based polymer thus prepared may be formed to have narrow molecular weight distribution, and preferably, in view of improving the physical properties of the polymer, the first alkylating agent may be methylaluminoxane or modified methylaluminoxane.

In the present invention, the catalyst composition may include the alkylating agent in 1 to 200 mol, particularly, 1 to 100 mol, more particularly, 3 to 20 mol based on 1 mol of the neodymium compound. If the alkylating agent is included in greater than 200 mol, the control of catalytic reaction during preparing the polymer is not easy, and an excessive amount of the alkylating agent may induce side-reactions.

(c) Halide

The type of the halide is not specifically limited, but may include halides used for preparing a common diene-based polymer, without specific limitation.

Particularly, the halide may include a diatomic halogen (simple substance), an interhalogen compound, hydrogen halide, an organic halide, a non-metal halide, a metal halide, and an organometallic halide, and any one thereof or mixtures of two or more thereof may be used. Among them, in consideration of catalyst activity enhancement and the resultant improving effects in reactivity, any one selected from the group consisting of an organic halide, a metal halide, and an organometallic halide, or mixtures of two or more thereof may be used as the halide.

The diatomic halogen may include a diatomic molecule compound such as fluorine ($F_2$), chlorine ($Cl_2$), bromine ($Br_2$), and iodine ($I_2$).

The interhalogen compound may include iodine monochloride, iodine monobromide, iodine trichloride, iodine pentafluoride, iodine monofluoride, or iodine trifluoride.

Furthermore, the hydrogen halide may include hydrogen fluoride, hydrogen chloride, hydrogen bromide, or hydrogen iodide.

Also, the organic halide may particularly include t-butyl chloride (t-BuCl), t-butyl bromide, allyl chloride, allyl bromide, benzyl chloride, benzyl bromide, chloro-di-phenylmethane, bromo-di-phenylmethane, triphenylmethyl chloride, triphenylmethyl bromide, benzylidene chloride, benzyliene bromide, methyltrichlorosilane, phenyltrichlorosilane, dimethyldichlorosilane, diphenyldichlorosilane, trimethylchlorosilane (TMSC1), benzoyl chloride, benzoyl bromide, propionyl chloride, propionyl bromide, methyl chloroformate, methyl bromoformate, iodomethane, diiodomethane, triiodomethane (also referred to as 'iodoform'), tetraiodomethane, 1-iodopropane, 2-iodopropane, 1,3-diiodopropane, t-butyl iodide, 2,2-dimethyl-1-iodopropane (also referred to as 'neopentyl iodide'), allyl iodide, iodobenzene, benzyl iodide, diphenylmethyl iodide, triphenylmethyl iodide, benzylidene iodide (also referred to as 'benzal iodide'), trimethylsilyl iodide, triethylsilyl iodide, triphenylsilyl iodide, dimethyldiiodosilane, diethyldiiodosilane, diphenyldiiodosilane, methyltriiodosilane, ethyltriiodosilane, phenyltriiodosilane, benzoyl iodide, propionyl iodide, and methyl iodoformate.

In addition, the non-metal halide may particularly include phosphorous trichloride, phosphorous tribromide, phosphorous pentachloride, phosphorous oxychloride, phosphorous oxybromide, boron trifluoride, boron trichloride, boron tribromide, silicon tetrafluoride, silicon tetrachloride ($SiCl_4$), silicon tetrabromide, arsenic trichloride, arsenic tribromide, selenium tetrachloride, selenium tetrabromide, tellurium tetrachloride, tellurium tetrabromide, silicon tetraiodide, arsenic triiodide, tellurium tetraiodide, boron triiodide, phosphorous triiodide, phosphorous oxyiodide, or selenium tetraiodide.

Also, the metal halide may particularly include tin tetrachloride, tin tetrabromide, aluminum trichloride, aluminum tribromide, antimony trichloride, antimony pentachloride, antimony tribromide, aluminum trifluoride, gallium trichloride, gallium tribromide, gallium trifluoride, indium trichloride, indium tribromide, indium trifluoride, titanium tetrachloride, titanium tetrabromide, zinc dichloride, zinc dibromide, zinc difluoride, aluminum triiodide, gallium triiodide, indium triiodide, titanium tetraiodide, zinc diiodide, germanium tetraiodide, tin tetraiodide, tin diiodide, antimony triiodide, or magnesium diiodide.

Furthermore, the organometallic halide may particularly include dimethylaluminum chloride, diethylaluminum chloride, dimethylaluminum bromide, diethylaluminum bromide, dimethylaluminum fluoride, diethylaluminum fluoride, methylaluminum dichloride, ethylaluminum dichloride, methylaluminum dibromide, ethylaluminum dibromide, methylaluminum difluoride, ethylaluminum difluoride, methylaluminum sesquichloride, ethylaluminum sesquichloride (EASC), isobutylaluminum sesquichloride, methylmagnesium chloride, methylmagnesium bromide, ethylmagnesium chloride, ethylmagnesium bromide, n-butylmagnesium chloride, n-butylmagnesium bromide, phenylmagnesium chloride, phenylmagnesium bromide, benzylmagnesium chloride, trimethyltin chloride, trimethyltin bromide, triethyltin chloride, triethyltin bromide, di-t-butyltin dichloride, di-t-butyltin dibromide, di-n-butyltin dichloride, di-n-butyltin dibromide, tri-n-butyltin chloride, tri-n-butyltin bromide, methylmagnesium iodide, dimethylaluminum iodide, diethylaluminum iodide, di-n-butylaluminum iodide, diisobutylaluminum iodide, di-n-octylaluminum iodide, methylaluminum diiodide, ethylaluminum diiodide, n-butylaluminum diiodide, isobutylaluminum diiodide, methylaluminum sesquiiodide, ethylaluminum sesquiiodide, isobutylaluminum sesquiiodide, ethylmagnesium iodide, n-butylmagnesium iodide, isobutylmagnesium iodide, phenylmagnesium iodide, benzylmagnesium iodide, trimethyltin iodide, triethyltin iodide, tri-n-butyltin iodide, di-n-butyltin diiodide, or di-t-butyl tin diiodide.

In addition, the catalyst composition according to an embodiment of the present invention may include the halide in 1 mol to 20 mol, more particularly, 1 mol to 5 mol, more particularly, 2 mol to 3 mol based on 1 mol of the neodymium compound. If the halide is included in greater than 20 mol, the removal of the catalytic reaction is not easy, and an excessive amount of the halide may arise side-reactions.

In addition, the catalyst composition of the present invention may include a non-coordinating anion-containing compound or a non-coordinating anion precursor compound instead of the halide or together with the halide.

Particularly, in the compound containing a non-coordinating anion, the non-coordinating anion is a sterically bulky anion that does not form a coordination bond with an active center of a catalyst system due to steric hindrance, and may be a tetraarylborate anion or a fluorinated tetraarylborate anion. In addition, the compound containing a non-coordinating anion may include a counter cation, for example, a carbonium cation such as a triarylcarbonium cation, an ammonium cation such as N,N-dialkyl anilinium cation, or a phosphonium cation, together with the above-described non-coordinating anion. More particularly, the compound containing a non-coordinating anion may include triphenylcarbonium tetrakis(pentafluorophenyl)borate, N,N-dimethylanilinium tetrakis(pentafluorophenyl)borate, triphenylcarbonium tetrakis[3,5-bis(trifluoromethyl)phenyl]borate, or N,N-dimethylanilinium tetrakis[3,5-bis(trifluoromethyl)phenyl]borate.

Also, the non-coordinating anion precursor may include, as a compound capable of forming a non-coordinating anion under the reaction conditions, a triaryl boron compound ($BR_3$, where R is a strong electron-withdrawing aryl group such as a pentafluorophenyl group and a 3,5-bis(trifluoromethyl)phenyl group).

(d) Conjugated Diene-Based Monomer

Also, the catalyst composition may further include a conjugated diene-based monomer, and, since the catalyst composition is used in the form of a preforming or premix catalyst composition in which a portion of the conjugated diene-based monomer used in the polymerization reaction is pre-polymerized by being premixed with the catalyst composition for polymerization, catalyst composition activity may not only be improved, but an active polymer thus prepared may be stabilized.

In the present invention, the term "preforming" may denote that, in a case in which a catalyst composition including a neodymium compound, an alkylating agent, and a halide, that is, a catalyst system includes diisobutylaluminum hydride (DIBAH), a small amount of a conjugated diene-based monomer such as 1,3-butadiene, is added to reduce the possibility of producing various catalyst composition active species, and pre-polymerization is performed in the catalyst composition system with the addition of the 1,3-butadiene. Also, the term "premix" may denote a state in which each compound is uniformly mixed in the catalyst composition system without being polymerized.

In this case, with respect to the conjugated diene-based monomer used for the preparation of the catalyst composition, some amount within a total amount range of the conjugated diene-based monomer used in the polymerization reaction may be used, for example, in an amount of 1 to 100 mol, particularly, 1 to 50 mol, or 1 to 40 mol based on 1 mol of the neodymium compound.

In the present invention, the catalyst composition may be prepared by mixing at least one of the above-described neodymium compound, alkylating agent, halide and conjugated diene-based monomer, particularly, the neodymium compound, alkylating agent and halide, and selectively conjugated diene-based monomer in an organic solvent. In this case, the organic solvent may be a nonpolar solvent having no reactivity with the constituent components of the catalyst composition.

Particularly, the nonpolar solvent may be a linear, branched or cyclic aliphatic hydrocarbon of 5 to 20 carbon atoms such as n-pentane, n-hexane, n-heptane, n-octane, n-nonane, n-decane, isopentane, isohexane, isopentane, isooctane, 2,2-dimethylbutane, cyclopentane, cyclohexane, methylcyclopentane and methylcyclohexane, a mixture solvent of an aliphatic hydrocarbon of 5 to 20 carbon atoms such as petroleum ether, petroleum spirits, and kerosene, or an aromatic hydrocarbon-based solvent such as benzene, toluene, ethylbenzene and xylene. Any one among them or mixtures of two or more thereof may be used. More particularly, the nonpolar solvent may be the linear, branched or cyclic aliphatic hydrocarbon of 5 to 20 carbon atoms or the mixture solvent of aliphatic hydrocarbon, more particularly, n-hexane, cyclohexane or a mixture thereof.

In addition, in the preparation method of a modified conjugated diene-based polymer of the present invention, after preparing an active polymer, a step of terminating polymerization by further using an additive, for example, a reaction quenching agent for the completion of the polymerization reaction such as polyoxyethylene glycol phosphate, or an antioxidant such as 2,6-di-t-butylparacresol, may be further included. In addition, together with the reaction quenching agent, an additive that facilitates solution polymerization, for example, an additive such as a chelating agent, a dispersant, a pH controlling agent, a deoxidizer, and an oxygen scavenger, may be further selectively used.

Step (S2)

Step 2 is a step of reacting the active polymer with a modifier represented by Formula 1 below, and may be a step for coupling a functional group derived from the modifier represented by Formula 1 with at least one terminal of the active polymer prepared in step (S1).

[Formula 1]

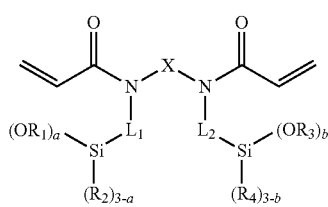

In Formula 1, the explanation on X, $L_1$ and $L_2$, $R_1$ to $R_4$, and a and b is the same as described above.

The modifier represented by Formula 1 may be used in to 20 mol based on 1 mol of the neodymium compound. Particularly, the modifier represented by Formula 1 may be used in 1 mol or more, 1.5 mol or more, 2.0 mol or more, 2.5 mol or more, and 20.0 mol or less, 10.0 mol or less, 5.0 mol or less, 4.0 mol or less based on 1 mol of the neodymium compound.

The modification reaction may be performed by solution reaction or solid phase reaction, particularly, by solution reaction. In another embodiment, the modification reaction may be performed using a batch type reactor, or by a continuous type using an apparatus such as a multi-step continuous reactor and an inline mixer.

The modification reaction may be performed under the same temperature and pressure conditions as a common polymerization reaction, and in a particular embodiment, may be performed at a temperature of 20 to 100° C., or may be performed at a temperature of 0 to 90° C. for 1 minute to 5 hours. Within this range, the viscosity of a polymer may not increase, and the activated terminal of the polymer may not be deactivated.

In the present invention, after finishing step (S2), the polymerization reaction may be terminated by adding an isopropanol solution of 2,6-di-t-butyl-p-cresol (BHT) to a polymerization reaction system.

In addition, after step (S2), a modified conjugated diene-based polymer may be obtained through a desolvation treatment such as steam stripping in which a partial pressure of a solvent is reduced by supplying water vapor, or a vacuum drying treatment. Also, in addition to the above-described modified conjugated diene-based polymer, an unmodified active polymer may be included in a reaction product obtained as a result of the above-described reaction.

Rubber Composition and Molded Product

Further, the present invention provides a rubber composition including the modified conjugated diene-based polymer and a molded product manufactured from the rubber composition.

The rubber composition may include the modified conjugated diene-based polymer in 0.1 to 100 wt %, particularly, 10 to 100 wt % or 20 to 90 wt %. If the amount of the modified conjugated diene-based polymer is less than 0.1 wt %, effects of improving the abrasion resistance and crack resistance of a resultant molded product manufactured by using the rubber composition, for example, a tire, may be insignificant.

Also, the rubber composition may further include other rubber components as necessary, in addition to the modified conjugated diene-based polymer, and in this case, the rubber component may be included in an amount of 90 wt % or less based on the total weight of the rubber composition. Particularly, the rubber component may be included in an amount of 1 to 900 parts by weight based on 100 parts by weight of the modified conjugated diene-based polymer.

The rubber component may be natural rubber or synthetic rubber, and, for example, the rubber component may be natural rubber (NR) including cis-1,4-polyisoprene; modified natural rubber such as an epoxidized natural rubber (ENR), deproteinized natural rubber (DPNR), and hydrogenated natural rubber, in which the general natural rubber is modified or purified; and synthetic rubber such as styrene-butadiene rubber (SBR), polybutadiene (BR), polyisoprene (IR), butyl rubber (IIR), an ethylene-propylene copolymer, polyisobutylene-co-isoprene, neoprene, poly(ethylene-co-propylene), poly(styrene-co-butadiene), poly(styrene-co-isoprene), poly(styrene-co-isoprene-co-butadiene), poly(isoprene-co-butadiene), poly(ethylene-co-propylene-co-diene), polysulfide rubber, acrylic rubber, urethane rubber, silicon rubber, epichlorohydrin rubber, and halogenated butyl rubber. Any one thereof or mixtures of two or more thereof may be used.

In addition, the rubber composition may include 0.1 to 150 parts by weight of a filler based on 100 parts by weight of the modified conjugated diene-based polymer, and the filler may include a silica-based filler, a carbon black filler, or a combination thereof. Particularly, the filler may be carbon black.

The carbon black-based filler is not specifically limited, but, for example, may have a nitrogen surface area per gram ($N_2SA$, measured according to JIS K 6217-2:2001) of $m^2/g$ to 250 $m^2/g$. Also, the carbon black may have a dibutyl phthalate (DBP) oil absorption of 80 cc/100 g to 200 cc/100 g. If the nitrogen surface area per gram of the carbon black is greater than 250 $m^2/g$, processability of a rubber composition may be reduced, and, if the nitrogen surface area per gram of the carbon black is less than 20 $m^2/g$, reinforcement by carbon black may be insignificant. Furthermore, if the DBP oil absorption of the carbon black is greater than 200 cc/100 g, the processability of the rubber composition may be reduced, and, if the DBP oil absorption of the carbon black is less than 80 cc/100 g, the reinforcement by carbon black may be insignificant.

Also, the silica is not specifically limited, but, for example, may include wet silica (hydrous silicic acid), dry silica (anhydrous silicic acid), calcium silicate, aluminum silicate, or colloidal silica. Particularly, the silica may be wet silica in which an effect of improving both fracture characteristics and wet grip is the most significant.

In addition, the silica may have a nitrogen surface area per gram ($N_2SA$) of 120 $m^2/g$ to 180 $m^2/g$, and a cetyltrimethylammonium bromide (CTAB) surface area per gram of 100 $m^2/g$ to 200 $m^2/g$. If the nitrogen surface area per gram of the silica is less than 120 $m^2/g$, reinforcement by silica may be reduced, and, if the nitrogen surface area per gram of the silica is greater than 180 $m^2/g$, the processability of a rubber composition may be degraded. Also, if the CTAB surface area per gram of the silica is less than 100 $m^2/g$, the reinforcement by silica, as the filler, may be degraded, and, if the CTAB surface area per gram of the silica is greater than 200 $m^2/g$, the processability of a rubber composition may be reduced.

Meanwhile if silica is used as the filler, a silane coupling agent may be used together for the improvement of reinforcement and low heat generation properties.

Particular examples of the silane coupling agent may be bis(3-triethoxysilylpropyl)tetrasulfide, bis(3-triethoxysilylpropyl)trisulfide, bis(3-triethoxysilylpropyl)disulfide, bis(2-triethoxysilylethyl)tetrasulfide, bis(3-trimethoxysilylpropyl)tetrasulfide, bis(2-trimethoxysilylethyl)tetrasulfide, 3-mercaptopropyl trimethoxysilane, 3-mercaptopropyl triethoxysilane, 2-mercaptoethyl trimethoxysilane, 2-mercaptoethyl triethoxysilane, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 3-trimethoxysilylpropyl benzothiazolyl tetrasulfide, 3-triethoxysilylpropyl benzolyl tetrasulfide, 3-triethoxysilylpropyl methacrylate monosulfide, 3-trimethoxysilylpropyl methacrylate monosulfide, bis(3-diethoxymethylsilylpropyl)tetrasulfide, 3-mercaptopropyl dimethoxymethylsilane, dimethoxymethylsilylpropyl-N,N-dimethylthiocarbamoyl tetrasulfide, or dimethoxymethylsilylpropyl benzothiazolyl tetrasulfide, and any one thereof or mixtures of two or more thereof may be used. More particularly, in consideration of the effects of improving the reinforcement, the silane coupling agent may be bis(3-triethoxysilylpropyl)polysulfide or 3-trimethoxysilylpropyl benzothiazyl tetrasulfide.

Also, the rubber composition according to an embodiment of the present invention may be sulfur cross-linkable, and accordingly, may further include a vulcanizing agent.

The vulcanizing agent may particularly be a sulfur powder, and may be included in 0.1 to 10 parts by weight based on 100 parts by weight of the rubber component. If the vulcanizing agent is included within the above range, elastic modulus and strength required for a vulcanized rubber composition may be secured and simultaneously, a low fuel consumption ratio may be obtained.

In addition, the rubber composition according to an embodiment of the present invention may further include various additives, particularly, a vulcanization accelerator, a process oil, a plasticizer, an antiaging agent, a scorch inhibitor, zinc white, stearic acid, a thermosetting resin, or a thermoplastic resin, used in the general rubber industry, in addition to the above-described components.

The vulcanization accelerator is not specifically limited, but particularly, a thiazole-based compound such as 2-mercaptobenzothiazole (M), dibenzothiazyl disulfide (DM), and N-cyclohexylbenzothiazole-2-sulfenamide (CZ), or a guanidine-based compound such as diphenylguanidine (DPG) may be used. The vulcanization accelerator may be included in 0.1 parts by weight to 5 parts by weight based on 100 parts by weight of the rubber component.

Also, the process oil acts as a softener in the rubber composition, and particularly, the process oil may be a paraffin-based, naphthene-based, or aromatic compound, and more particularly, the aromatic process oil may be used in consideration of tensile strength and abrasion resistance, and the naphthene-based or paraffin-based process oil may be used in consideration of hysteresis loss and low temperature characteristics. The process oil may be included in an amount of 100 parts by weight or less based on 100 parts by weight of the rubber component, and if the process oil is included in the above amount, decreases in tensile strength and low heat generation property (low fuel consumption ratio) of the vulcanized rubber may be prevented.

In addition, the antiaging agent may particularly use N-isopropyl-N'-phenyl-p-phenylenediamine, N-(1,3-dimethylbutyl)-N'-phenyl-p-phenylenediamine, 6-ethoxy-2,2,4-trimethyl-1,2-dihydroquinoline, or a high-temperature condensate of diphenylamine and acetone. The antiaging agent may be used in 0.1 to 6 parts by weight based on 100 parts by weight of the rubber component.

The rubber composition according to an embodiment of the present invention may be obtained by kneading the above compounding prescription using a kneader such as a Banbury mixer, a roll, and an internal mixer, and a rubber composition having excellent abrasion resistance as well as low heat generation property may be obtained by a vulcanization process after molding.

Accordingly, the rubber composition may be useful for the manufacture of each member of a tire such as a tire's tread, an under tread, a sidewall, a carcass coating rubber, a belt coating rubber, a bead filler, a chafer, and a bead coating rubber, or various industrial rubber products such as an anti-vibration rubber, a belt conveyor, and a hose.

The molded product manufactured by using the rubber composition may include a tire or a tire's tread.

EXAMPLES

Hereinafter, the present invention will be described in more detail according to examples. However, the following examples are merely presented to exemplify the present invention, and the scope of the present invention is not limited thereto.

PREPARATION OF MODIFIER

Preparation Example 1

[Formula 1-1]

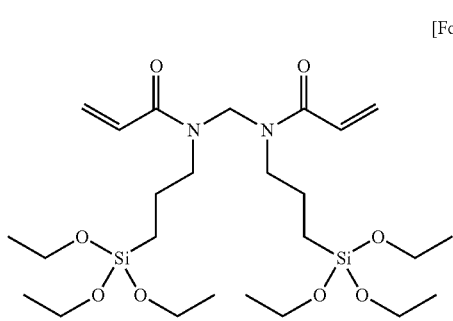

To a 250 ml, dried round-bottom flask (RBF), 10 g (50 mmol) of dibromopropane and 110 g (250 mmol) of (3-aminopropyl)triethoxysilane were put and reacted at 100° C. for 4 hours. After finishing the reaction, the temperature was lowered to room temperature, 500 ml of hexane was injected for dilution, and the resultant product was filtered. The filtrates thus obtained were collected and concentrated. The mixture thus concentrated was distilled in vacuum at 140° C., and an excessive amount of (3-aminopropyl)triethoxysilane was removed to obtain 24 g (>99%) of $N^1,N^3$-bis(3-triethoxysilyl)propyl)propane-1,3-diamine.

To a 100 ml, dried RBF, 2.9 g (6 mmol) of $N^1, N^3$-bis (3-triethoxysilyl)propyl)propane-1,3-diamine obtained above, and 14.4 mmol of acryloyl chloride were put and dissolved in DCM (30 ml). At 0° C., 15.6 mmol of triethylamine was added dropwisely and reacted at room temperature for 2 hours. After finishing the reaction, MTBE (30 ml) was injected for dilution, and the resultant product was filtered. The filtrates were collected and concentrated to obtain a modifier (3.3 g, 92%).

$^1$H NMR(500 MHz, CDCl$_3$): δ6.62-6.57(m, 2H), 6.38-6.29(m, 2H), 5.70-5.64(m, 2H), 3.82(q, J=7.0 Hz, 12H), 3.42-3.31(m, 8H), 1.85(q, J=7.5 Hz, 2H), 1.69-1.65(m, 4H), 1.23(t, J=7.0 Hz, 18H), 0.62-0.55(m, 4H)

Comparative Preparation Example 1

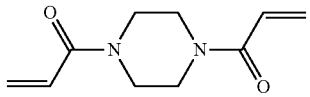

To a 250 ml, dried RBF, 5 g (58 mmol) of piperazine and 24 g (174 mmol) of potassium carbonate were put and dissolved in toluene (50 ml). At 0° C., 139 mmol of acryloyl chloride was added dropwisely and reacted at room temperature overnight. After finishing the reaction, a solid material was filtered, and filtrates were separately collected and concentrated to obtain the modifier (8.8 g, 78%).

Comparative Preparation Example 2

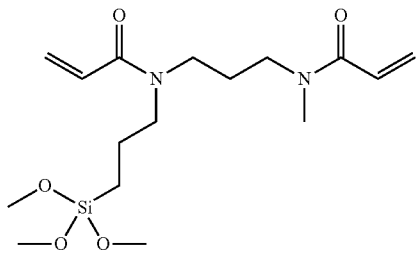 [SMILES: C=CC(=O)N(C)CCCN(CCC[Si](OC)(OC)OC)C(=O)C=C]

1) Preparation of $N^1$-methyl-$N^3$-(3-(trimethoxysilyl)propyl)propan-1,3-diamine In a 250 ml, dried RBF, to 10 g (113 mmol) of an N-methyl-1,3-diaminopropane solution, 33.7 g (170 mmol) of (3-chloropropyl)trimethoxysilane was injected and reacted at 90° C. for 6 hours. After finishing the reaction, 100 ml of toluene was added, and the solid fraction thus produced was filtered by a filter. After concentrating under a reduced pressure, through distillation in vacuum, $N^1$-methyl-$N^3$-(3-(trimethoxysilyl)propyl)propan-1,3-diamine was obtained (25.5 g, 90%).

2) Preparation of N-methyl-N-(3-(N-(3-(trimethoxysilyl) propyl)acrylamido)propyl)acrylamide To a 250 ml, dried RBF, 27.7 g (102 mol) of $N^1$-methyl-$N^3$-(3-(trimethoxysilyl)propyl)propan-1,3-diamine, and 25.8 g (225 mol) of triethylamine were put and dissolved in 100 ml of dichloromethane. At 0° C., 128 mmol of acryloyl chloride was slowly added dropwisely and reacted at room temperature for 3 hours. After finishing the reaction, 100 ml of hexane was added, a solid fraction was precipitated and filtered. The filtrate was concentrated to obtain the modifier (32.2 g, 88%).

Comparative Preparation Example 3

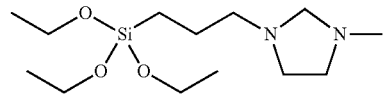 [SMILES: CCO[Si](CCCN1CCN(C)C1)(OCC)OCC]

To a 250 ml, dried RBF, 4 g (46 m mol) of 1-methylimidazolidine and 4.4 g (43 mol) of triethylamine were put and dissolved in 30 ml of acetonitrile. 10.7 g (54 mmol) of (3-chloropropyl)trimethoxysilane was injected and racted at 120° C. overnight. After finishing the reacton, the solvent was reoved under a reduced pressure, 50 ml of hexane was injected and stirred. A solid was filtered using a filter, a hexane layer was connected to obtain the modifier (8.8 g, 77%).

PREPARATION OF MODIFIED CONJUGATED DIENE-BASED POLYMER

Example 1

To a 6 L, well-dried autoclave reactor, n-hexane (2700 g) and 1,3-butadiene (300 g) were put, and the internal temperature of the reactor was elevated to 60° C. A catalyst composition prepared by mixing a neodymium compound (neodymium versatate, NdV), diisobutylaluminum hydride (DIBAH), diethylalminum chloride and a small amount of 1,3-butadiene (1,3-BD) in a molar ratio of 1:9.7:2.5:34.7 was injected in a ratio of 0.18 mmol of neodymium compound/100 g of 1,3-butadiene, and polymerized for 30 minutes while stirring at 300 rpm.

After that, the modifier represented by Formula 1-1 of Preparation Example 1 was injected into the reactor (in a molar ratio of modifier:NdV=3.0:1.0), and modification reaction was performed for 15 minutes.

After finishing the modification reaction, polyoxyethylene glycol phosphate (0.2 phr) as a reaction quenching agent, and 2,6-di-t-butyl-p-cresol (1.0 phr) as an antioxidant were injected to terminate the reaction, and solvents were removed through steam stripping. Then, remaining solvents and water were removed by roll drying to prepare a modified butadiene polymer.

Example 2

A modified butadiene polymer was prepared by the same method in Example 1 except for changing the reaction conditions as in Table 1 below.

Comparative Example 1

A modified butadiene polymer was prepared by the same method in Example 1 except for changing the reaction conditions as in Table 1 below.

Comparative Example 2

GND-45 (LG Chem, Co.) was used as an unmodified butadiene polymer.

Comparative Example 3

CB22 (Arlanxeo Co.) was used as an unmodified butadiene polymer.

Comparative Examples 4 to 6

Modified butadiene polymers were prepared by the same method in Example 1 except for changing the reaction conditions as in Table 1 below.

TABLE 1

| | Example | | Comparative Example | | | | | |
|---|---|---|---|---|---|---|---|---|
| Division Modifier | 1 Preparation Example 1 | 2 Preparation Example 1 | 1 | 2 | 3 | 4 Comparative Preparation Example 1 | 5 Comparative Preparation Example 2 | 6 Comparative Preparation Example 3 |
| NdV (mmol/1,3-BD 100 g) | 0.18 | 0.24 | 0.16 | — | — | 0.28 | 0.18 | 0.18 |
| Molar ratio of modifier:NdV | 3.0:1.0 | 3.5:1.0 | — | — | — | 5.2:1.0 | 6.0:1.0 | 6.0:1.0 |

Experimental Example 1

With respect to the polymers of the Examples and the Comparative Examples, physical properties were measured according to the methods below, and the results are shown in Table 1.

(1) Weight Average Molecular Weight (Mw), Number Average Molecular Weight (Mn) and Molecular Weight Distribution (MWD)

Each polymer was dissolved in tetrahydrofuran (THF) for 30 minutes under 40° C. conditions, and then loaded on gel permeation chromatography (GPC) and flown. In this case, two columns of PLgel Olexis and one column of PLgel mixed-C (trade name, Polymer Laboratories Co.) were used in combination. Also, newly replaced columns were all mixed bed type columns, and polystyrene was used as a gel permeation chromatography (GPC) standard material.

(2) Mooney Viscosity (RP, Raw polymer)

The Mooney viscosity (ML1+4, @100° C.) (MU) was measured by using Large Rotor of MV2000E of Monsanto Co. at a rotor speed of 2±0.02 rpm at 100° C. A specimen used was stood at room temperature (23±5° C.) for 30 minutes or more, and 27±3 g of the specimen was collected and put in a die cavity, and then, Platen was operated, and the Mooney viscosity was measured while applying torque.

(3) Modification Ratio

The modification ratio was calculated using a chromatogram obtained from the measurement of chromatography. Particularly, each polymer was dissolved in tetrahydrofuran (THF) under 40° C. conditions to prepare a specimen, and each specimen was injected into gel permeation chromatography, tetrahydrofuran was flown as an eluent to obtain a chromatogram, and from the chromatogram thus obtained, the modification ratio was calculated by Mathematical Formula 1 below.

Modification ratio (%)=[(peak area of derived unit of conjugated diene-based monomer coupled with functional group derived from modifier)/(total peak area of modified conjugated diene-based polymer)]×100  [Mathematical Formula 1]

above. Particularly, the Mooney viscosity (FMB) was measured using MV2000E of Monsanto Co. using Large Rotor at a rotor speed of 2±0.02 rpm at 100° C. In this case, a specimen used was stood at room temperature (23±5° C.) for 30 minutes or more, and 27±3 g of the specimen was collected and put in a die cavity, and then, Platen was operated, and the Mooney viscosity (FMB) was measured while applying torque.

TABLE 2

| | | Example | | Comparative Example | | | | | |
|---|---|---|---|---|---|---|---|---|---|
| Division | | 1 | 2 | 1 | 2 | 3 | 4 | 5 | 6 |
| GPC Results | Mn (×$10^5$ g/mol) | 2.71 | 2.59 | 2.53 | 2.30 | 3.15 | 2.45 | 2.61 | 2.49 |
| | Mw (×$10^5$ g/mol) | 7.91 | 7.70 | 6.73 | 6.66 | 7.63 | 8.02 | 6.63 | 5.78 |
| | MWD (Mw/Mn) | 2.92 | 2.97 | 2.66 | 2.89 | 2.42 | 3.27 | 2.54 | 2.32 |
| Mooney viscosity (RP) ($M_{1+4}$, @ 100° C.) (MU) | | 70 | 66 | 43 | 44 | 63 | 69 | 62 | 42 |
| Modification ratio (%) | | 61 | 63 | — | — | — | 38 | 41 | 5 |

As shown in Table 2 above, it was confirmed that the modified butadiene polymers of Examples 1 and 2, prepared using the modifier represented by Formula 1 according to the present invention showed high modification ratios and were prepared into structures including a large number of functional groups derived from the modifier represented by Formula 1.

Experimental Example 2

With respect to 100 parts by weight of each polymer of the Examples and the Comparative Examples, 95 parts by weight of silica (7000GR), 12.8 parts by weight of carbon black (X-50S), 40.0 parts by weight of a process oil (TDAE OIL), 3.0 parts by weight of zinc oxide (ZnO), 2.0 parts by weight of stearic acid, 2.0 parts by weight of an antiaging agent (6PPD), 1.5 parts by weight of an antioxidant (TMQ), and 2.0 parts by weight of wax were compounded to prepare each rubber composition.

Thereafter, 1.5 parts by weight of sulfur, 1.25 parts by weight of CBS, and 1.5 parts by weight of a vulcanization accelerator (DPG) were added to each rubber composition and gently mixed at 50° C. for 1.5 minutes at 50 rpm and then, a vulcanized mixture compound in a sheet shape was obtained using a roll of 50° C. The vulcanized mixture compound was vulcanized at 160° C. for 25 minutes to prepare a rubber specimen.

(1) Mooney Viscosity (FMB, Final Master Batch) and Mooney Viscosity Difference (AMV, FMB-RP)

The Mooney viscosity (ML1+4, @100° C.) (MU) was measured using the vulcanized mixture compound prepared In addition, the Mooney viscosity and the Mooney viscosity difference of the mixture compound (ΔMV, FMB-RP) of each polymer shown in the Table above were calculated. In this case, the small Mooney viscosity difference means excellent processability.

(2) Tensile Strength, M-300% (300% Modulus) and Elongation

After vulcanizing each rubber composition at 150° C. for t90 minutes, tensile strength (kg·f/$cm^2$) of a vulcanized product, modulus when elongated by 300% (M-300%, 300% modulus, kg·f/$cm^2$) and elongation of a vulcanized product when breaking (%) were measured according to ASTM D412.

(3) Abrasion Resistance (DIN Abrasion Test)

With respect to each rubber specimen, DIN abrasion test was conducted based on ASTM D5963 and represented by DIN wt loss index (loss volume index:abrasion resistance index (ARIA), Method A). The high index represents excellent abrasion resistance.

(4) Viscoelasticity Properties

For measuring Tan δ properties, that are the most important factors of low fuel consumption ratio, a viscoelasticity coefficient (Tan δ) was measured using DMTS 500N of Gabo Co. in Germany at a frequency of 10 Hz, prestrain of 3%, and dynamic strain of 3%. The Tan δ value at 0° C. represents road surface resistance, and the Tan δ value at 60° C. represents rotation resistance properties (fuel consumption ratio).

TABLE 3

| | | Example | | Comparative Example | | | | | |
|---|---|---|---|---|---|---|---|---|---|
| Division | | 1 | 2 | 1 | 2 | 3 | 4 | 5 | 6 |
| Mooney viscosity (FMB) | | 59.0 | 54.0 | 65.0 | 60.3 | 66.3 | 66.3 | 53.3 | 55.7 |
| ΔMV (FMB-RP) | | −11.0 | −12.0 | 22.0 | 16.3 | 3.3 | −2.7 | −8.7 | 13.7 |
| Tensile properties | Tensile strength | 109 | 110 | 100 | 102 | 108 | 107 | 105 | 101 |
| | M-300% | 113 | 109 | 100 | 101 | 107 | 104 | 108 | 103 |
| | Elongation | 107 | 108 | 100 | 98 | 106 | 101 | 104 | 99 |
| Abrasion resistance | | 113 | 114 | 100 | 102 | 108 | 112 | 110 | 103 |

TABLE 3-continued

| | | Example | | Comparative Example | | | | | |
|---|---|---|---|---|---|---|---|---|---|
| Division | | 1 | 2 | 1 | 2 | 3 | 4 | 5 | 6 |
| Viscoelasticity properties | Tanδ @ 0° C. | 100 | 101 | 100 | 99 | 95 | 100 | 99 | 101 |
| | Tanδ @ 60° C. | 106 | 105 | 100 | 99 | 105 | 104 | 104 | 102 |

In Table 3, the resultant values of the tensile properties, abrasion resistance and Tan δ value at 0° C. were calculated and indexed by Mathematical Formula 2 below based on the measured values of Comparative Example 1, and the Tan δ value at 60° C. was calculated and indexed by Mathematical Formula 3 below.

Index=(measured value/standard value)×100  [Mathematical Formula 2]

Index=(standard value/measured value)×100  [Mathematical Formula 3]

As shown in Table 3, the rubber specimens of the Examples manufactured using the modifier represented by Formula 1 according to the present invention showed excellent processability in contrast to the Comparative Examples, and at the same time, all the tensile properties, abrasion resistance and viscoelasticity properties were improved.

The invention claimed is:

1. A modifier represented by the following Formula 1:

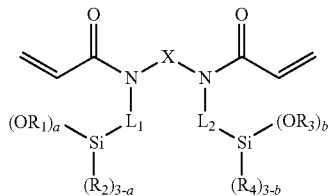

[Formula 1]

wherein,
X is an alkylene group of 1 to 20 carbon atoms, a cycloalkylene group of 5 to 20 carbon atoms or an arylene group of 6 to 20 carbon atoms,
$L_1$ and $L_2$ are each independently an alkylene group of 1 to 20 carbon atoms, a cycloalkylene group of 5 to 20 carbon atoms or an arylene group of 6 to 20 carbon atoms,
$R_1$ to $R_4$ are each independently an alkyl group of 1 to 20 carbon atoms, and
a and b are each independently an integer of 1 to 3.

2. The modifier according to claim 1, wherein
X is an alkylene group of 1 to 12 carbon atoms,
$L_1$ and $L_2$ are each independently an alkylene group of 1 to 12 carbon atoms,
$R_1$ to $R_4$ are each independently an alkyl group of 1 to 12 carbon atoms, and
a and b are each independently an integer of 2 or 3.

3. The modifier according to claim 1, wherein
X is an alkylene group of 1 to 4 carbon atoms,
$L_1$ and $L_2$ are each independently an alkylene group of 1 to 6 carbon atoms,
$R_1$ to $R_4$ are each independently an alkyl group of 1 to 4 carbon atoms, and
a and b are each independently an integer of 2 or 3.

4. The modifier according to claim 1, wherein the modifier represented by Formula 1 is a compound represented by the following Formula 1-1:

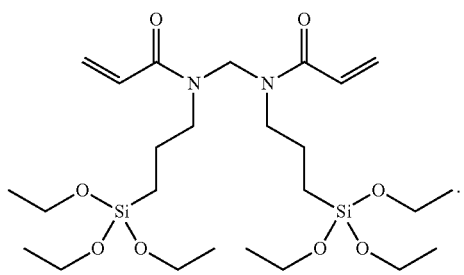

[Formula 1-1]

5. A modified conjugated diene-based polymer comprising a functional group derived from a modifier represented by the following Formula 1:

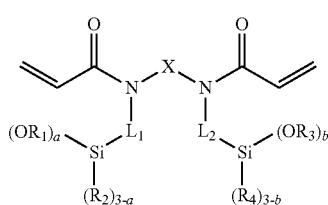

[Formula 1]

wherein,
X is an alkylene group of 1 to 20 carbon atoms, a cycloalkylene group of 5 to 20 carbon atoms or an arylene group of 6 to 20 carbon atoms,
$L_1$ and $L_2$ are each independently an alkylene group of 1 to 20 carbon atoms, a cycloalkylene group of 5 to 20 carbon atoms or an arylene group of 6 to 20 carbon atoms,
$R_1$ to $R_4$ are each independently an alkyl group of 1 to 20 carbon atoms, and
a and b are each independently an integer of 1 to 3.

6. The modified conjugated diene-based polymer according to claim 5, wherein a number average molecular weight is from 100,000 to 1,000,000 g/mol.

7. The modified conjugated diene-based polymer according to claim 5, wherein a weight average molecular weight is from 300,000 to 1,500,000 g/mol.

8. The modified conjugated diene-based polymer according to claim 5, wherein molecular weight distribution is from 1.1 to 4.0.

9. The modified conjugated diene-based polymer according to claim 5, wherein a Mooney viscosity at 100° C. is from 20 to 100.

10. A method for preparing a modified conjugated diene-based polymer, comprising:
polymerizing a conjugated diene-based monomer in a presence of a catalyst composition comprising a neodymium compound in a hydrocarbon solvent to prepare an active polymer; and reacting the active polymer and a modifier represented by the following Formula 1:

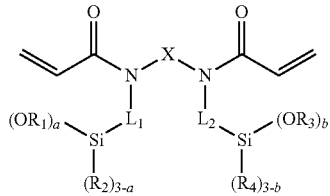
[Formula 1]

wherein,

X is an alkylene group of 1 to 20 carbon atoms, a cycloalkylene group of 5 to 20 carbon atoms or an arylene group of 6 to 20 carbon atoms, $L_1$ and $L_2$ are each independently an alkylene group of 1 to 20 carbon atoms, a cycloalkylene group of 5 to 20 carbon atoms or an arylene group of 6 to 20 carbon atoms, $R_1$ to $R_4$ are each independently an alkyl group of 1 to 20 carbon atoms, and a and b are each independently an integer of 1 to 3.

11. The method according to claim 10, wherein the neodymium compound is from 0.1 to 0.5 mmol based on 100 g of the conjugated diene-based monomer.

12. The method according to claim 10, wherein the modifier represented by Formula 1 is from 1 to 20 mol based on 1 mol of the neodymium compound.

13. The method according to claim 10, wherein the neodymium compound is a compound represented by the following Formula 4:

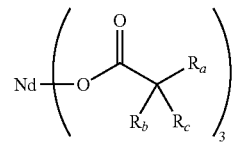
[Formula 4]

wherein, $R_a$ to $R_c$ are each independently hydrogen or an alkyl group of 1 to 12 carbon atoms, where $R_a$ to $R_c$ are not hydrogen at the same time.

14. The method according to claim 10, wherein the polymerization is performed at a temperature of 20 to 200° C.

* * * * *